UNITED STATES PATENT OFFICE.

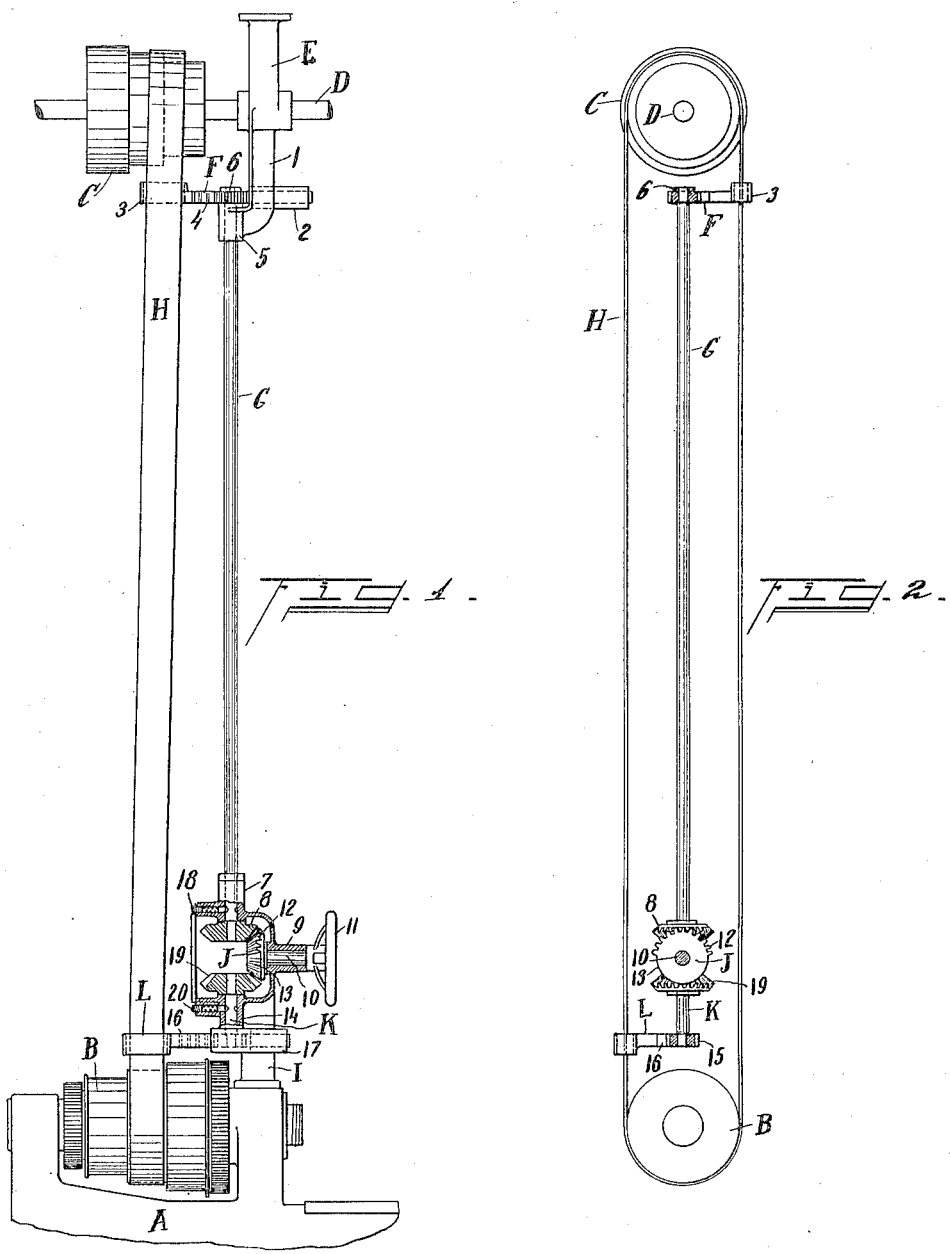

ARTHUR C. PLETZ, OF CINCINNATI, OHIO.

BELT-SHIFTER.

1,089,152.  Specification of Letters Patent.  Patented Mar. 3, 1914.

Application filed June 11, 1913. Serial No. 772,981.

*To all whom it may concern:*

Be it known that I, ARTHUR C. PLETZ, a citizen of the United States, residing at Cincinnati, in the county of Hamilton and State of Ohio, have invented certain new and useful Improvements in Belt-Shifters, of which the following is a specification.

This invention relates to a belt shifter and it comprises an instrumentality adapted for use in connection with machine tools of conventional design whereby a belt extending from a counter shaft pulley to a pulley on the tool may be very easily shifted from one step to another.

One object within the contemplation of this invention is to render available a belt shifting mechanism in the nature of an attachment that may be affixed to any given machine tool and which will extend to the counter shaft so as to enable the belt to be shifted by a positive acting member located adjacent the counter shaft and by another positive acting member located adjacent the machine tool.

Other objects will be in part obvious from the annexed drawings and in part indicated in connection therewith by the following analysis of this invention.

This invention accordingly consists in the features of construction, combination of parts, and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Figure 1 is a side elevation partly in section showing the belt shifter applied to a lathe and extending to an overhead counter shaft. Fig. 2 is an end elevation of the same.

Continuing now by way of a more detailed description, it may be noted that whereas in my copending application Serial No. 770,600, filed May 29, 1913, I have shown a belt shifting arrangement primarily adapted to be built into a machine tool organization, in this instance there is revealed a mechanism that very conveniently may be applied to already installed machinery.

Referring to Fig. 1, A indicates a portion of the frame of a machine tool, here shown as a lathe, and B indicates a step cone pulley of conventional description mounted in the frame A and operative to drive the spindle of the tool. A complementary step cone pulley C is here mounted on a counter shaft D which is suspended from the ceiling by means of a hanger E. This hanger has a depending arm 1 having a bearing hub 2, in which translates a shifting arm F terminating in a belt-retaining ring 3 and carrying a rack 4 along one of its sides. A shaft G is journaled in a hub 5 carried by the arm 1 and to the end of the shaft is secured a pinion 6 which meshes with the rack 4 and enables the belt shifter F to be reciprocated or translated by a rotation of the shaft G. In this way, the belt shifter F enables the upper end of the belt H to be moved from one step to another of the cone pulley C. The means for actuating the shaft G will now be described.

A bracket I adapted to be secured to an appropriate part of the frame of the machine tool carries a hub 7 similar to the hub 5 through which the shaft G is journaled, and on the lower end of the shaft G is secured a bevel 8. A second hub 9 supports the stub shaft 10 operated by the hand wheel 11 and this shaft carries a peculiar bevel J which is here shown as a half bevel, having one half of its periphery provided with teeth 12 and the other half being smooth, as indicated by 13. A third hub 14 is also provided by the bracket I and supports a shaft K which terminates in a pinion 15 meshing with a rack 16 on a belt-shifter L slidably carried by the fourth hub 17 of the bracket I. This latter shifter is similar to that already described.

It is noteworthy that shifters F and L are on opposite sides of the axis of the shafts G and K, so as to act in the same direction. Now, when the hand-wheel 11 is rotated a half-revolution the shaft G will be turned a half-revolution and then the teeth 12 will leave their mesh with the bevel 8 and the shaft G will be yieldably locked in appropriate position by means of a spring-pressed detent 18. During this time the bevel 19 will not have been turned by reason of the fact that the smooth periphery 13 precludes tooth engagement, but as soon as the hand-wheel 11 is further turned the teeth 12 will engage those of the bevel 19 and it will be turned a half-revolution and then held in appropriate position for tooth intermesh by a spring plunger 20. The racks and pinions above mentioned are so designed and proportioned that these movements will be sufficient to cause a lateral shifting of the belt through a distance equal to the width of a step of the pulley.

Without further elaboration, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, I claim as new and desire to secure by Letters Patent of the United States:—

1. A belt shifter of the nature disclosed combining an upper and a lower bracket; a belt-shifting member movably mounted in each of said brackets; a hand-operated gear segment; a pair of gears, each located in opposite relations with said gear segment and adapted to be actuated in alternate succession thereby; and means operatively connecting said gears with said members to move first the one and then the other in the same direction when said gear-segment is progressively rotated.

2. A belt shifter of the nature disclosed combining an upper and lower bracket; a belt-shifting member movably mounted in each of said brackets; a hand-operated bevel-gear segment; a pair of bevel gears, each located in opposite relations with said gear-segment and adapted to be actuated alternately thereby; and means operatively connecting said gears with said members to move first the one and then the other in the same direction when said gear-segment is progressively rotated.

3. A belt shifter of the nature disclosed combining an upper and a lower bracket; a belt-shifting member movably mounted in each of said brackets; a hand-operated gear segment; a pair of gears, each located on opposite sides of the axis of said gear segment and adapted to be actuated in alternate succession thereby; and means operatively connecting said gears with said members to move first the one and then the other in the same direction when said gear-segment is progressively rotated.

4. A belt shifter of the nature disclosed combining an upper and a lower bracket; a belt-shifting member movably mounted in each of said brackets; a hand-operated bevel gear segment; a pair of bevel gears, each located on opposite sides of the axis of said gear segment and adapted to be actuated in alternate succession thereby; and two shafts; each operatively connecting one of said gears with one of said members to move first the one member and then the other in the same direction when said gear-segment is progressively rotated.

5. A belt shifter of the nature disclosed combining an upper and a lower bracket; a belt-shifting member movably mounted in each of said brackets; a hand-operated bevel gear segment; a pair of coaxial bevel gears, each located on opposite sides of the axis of said gear segment and adapted to be actuated in alternate succession thereby; and a long and a short shaft operatively connecting said gears with said members to move first the one and then the other in the same direction when said gear-segment is progressively rotated.

In testimony whereof, I have hereunto set my hand.

ARTHUR C. PLETZ.

Witnesses:
OLIVER B. KAISER,
CLARENCE B. FOSTER.

---

Copies of this patent may be obtained for five cents each, by addressing the "Commissioner of Patents, Washington, D. C."